United States Patent
Naito

(10) Patent No.: US 9,606,246 B2
(45) Date of Patent: Mar. 28, 2017

(54) RADIATION IMAGE SENSING APPARATUS AND RADIATION IMAGE SENSING SYSTEM

(71) Applicant: CANON KABUSHIKI KAISHA, Tokyo (JP)

(72) Inventor: Yuichi Naito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/934,309

(22) Filed: Nov. 6, 2015

(65) Prior Publication Data
US 2016/0139276 A1    May 19, 2016

(30) Foreign Application Priority Data

Nov. 17, 2014  (JP) .................................. 2014-232940

(51) Int. Cl.
*G01T 1/17* (2006.01)
*G01T 1/20* (2006.01)

(52) U.S. Cl.
CPC .................................. *G01T 1/2018* (2013.01)

(58) Field of Classification Search
CPC .................................. G01T 1/17; G01T 7/00
See application file for complete search history.

(56) References Cited

U.S. PATENT DOCUMENTS

| | | | |
|---|---|---|---|
| 2002/0190215 A1 | 12/2002 | Tashiro et al. | ............ 250/370.11 |
| 2003/0146383 A1* | 8/2003 | Knauth | ..................... G01J 5/24 |
| | | | 250/338.1 |
| 2004/0129882 A1* | 7/2004 | Mashio | ..................... G01J 5/02 |
| | | | 250/338.1 |
| 2007/0195192 A1* | 8/2007 | Miyanari | ............... H04N 5/232 |
| | | | 348/370 |
| 2012/0126129 A1* | 5/2012 | Nakatsugawa | ........ A61B 6/548 |
| | | | 250/369 |
| 2014/0036118 A1 | 2/2014 | Dowaki et al. | ............... 348/294 |
| 2014/0037056 A1 | 2/2014 | Naito et al. | ..................... 378/62 |
| 2016/0062423 A1* | 3/2016 | Kim | ........................ G06F 1/206 |
| | | | 713/320 |

FOREIGN PATENT DOCUMENTS

JP    A 2002-345797    12/2002

* cited by examiner

*Primary Examiner* — Marcus Taningco
(74) *Attorney, Agent, or Firm* — Fitzpatrick, Cella, Harper & Scinto

(57) ABSTRACT

A radiation image sensing apparatus includes an image sensor configured to sense a plurality of radiation images at a frame rate according to a synchronization signal, and a controller configured to control the image sensor. In a case in which the frame rate is lower than a predetermined frame rate, the controller causes the image sensor to perform a temperature controlling operation of generating additional heat other than heat generated by an image sensing operation in addition to the image sensing operation so as to reduce a change in a temperature of the image sensor.

23 Claims, 11 Drawing Sheets

RADIATION IMAGE SENSING APPARATUS AND RADIATION IMAGE SENSING SYSTEM

BACKGROUND OF THE INVENTION

Field of the Invention

The present invention relates to a radiation image sensing apparatus and a radiation image sensing system.

Description of the Related Art

There exists a radiation image sensing apparatus capable of continuously sensing a plurality of radiation images. Japanese Patent Laid-Open No. 2002-345797 describes a radiation image sensing apparatus including a radiation source that intermittently emits radiation to an object, a converter that converts the radiation from the object into an optical signal, and an image sensor that converts the optical signal into an electric signal.

In the radiation image sensing apparatus capable of continuously sensing a plurality of radiation images, when the frame rate is changed, power consumption of the radiation image sensing apparatus accordingly changes, and generated noise may also change. That is, the change in the frame rate may cause a change in noise, that is, degradation of image quality of the plurality of sensed radiation images.

SUMMARY OF THE INVENTION

The present invention provides a technique advantageous in reducing degradation of image quality in a case in which a frame rate is changed in a radiation image sensing apparatus that is capable of continuously sensing a plurality of radiation images.

The present invention provides a radiation image sensing apparatus comprising an image sensor configured to sense a plurality of radiation images at a frame rate according to a synchronization signal, and a controller configured to control the image sensor, wherein in a case in which the frame rate is lower than a predetermined frame rate, the controller causes the image sensor to perform a temperature controlling operation of generating additional heat other than heat generated by an image sensing operation in addition to the image sensing operation so as to reduce a change in a temperature of the image sensor.

Further features of the present invention will become apparent from the following description of exemplary embodiments with reference to the attached drawings.

DESCRIPTION OF THE EMBODIMENTS

Figure 1:
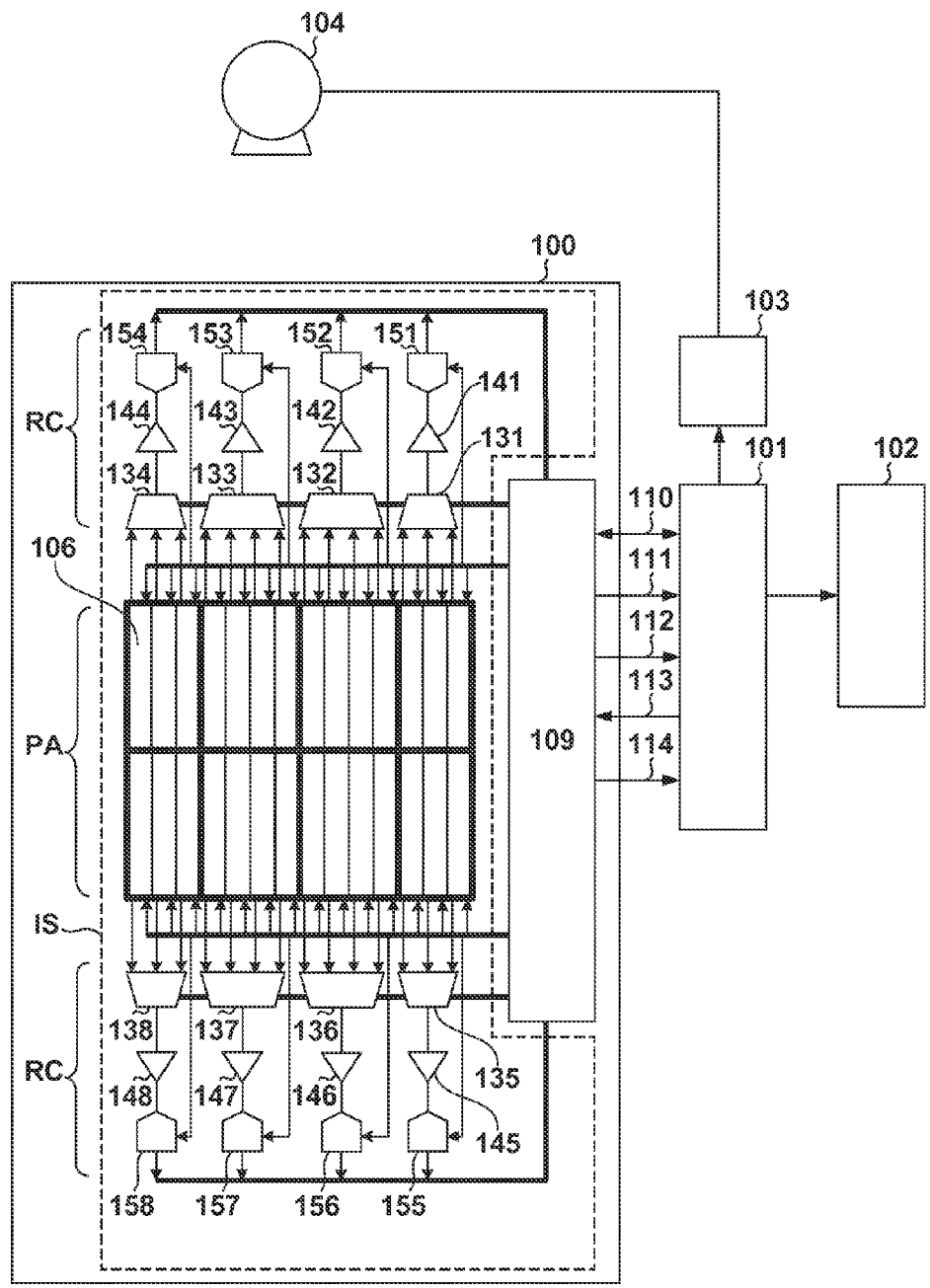
FIG. 1 is a block diagram showing the arrangement of a radiation image sensing system according to an embodiment of the present invention.

The present invention will now be described with reference to the accompanying drawings by way of exemplary embodiments. FIG. 1 shows the arrangement of a radiation image sensing system 1 according to an embodiment of the present invention. The radiation image sensing system 1 includes a radiation image sensing apparatus 100, a system control unit 101, an image displaying unit 102, a radiation source control unit 103, and a radiation source 104. The system control unit 101 controls the radiation image sensing apparatus 100 and the radiation source control unit 103 such that the radiation image sensing apparatus 100 and the radiation source control unit 103 synchronously operate. All or some of the functions of the system control unit 101 may be incorporated in, for example, the radiation image sensing apparatus 100. Synchronization control of the radiation image sensing apparatus 100 and the radiation source control unit 103 can be done by a synchronization signal SYNC generated by the system control unit 101. The radiation source control unit 103 controls irradiation of radiation from the radiation source 104.

The radiation emitted by the radiation source 104 passes through a subject and enters the radiation image sensing apparatus 100. The radiation image sensing apparatus 100 detects a radiation image formed by the radiation that has entered and provides the radiation image to the system control unit 101. The system control unit 101 processes the radiation image provided from the radiation image sensing apparatus 100, and displays the processed radiation image on the image displaying unit 102. The radiation source 104 has a function of intermittently emitting radiation in synchronism with the synchronization signal SYNC. The radiation image sensing apparatus 100 has a function of sensing a radiation image in synchronism with the synchronization signal SYNC. The system control unit 101 can change the period of the synchronization signal SYNC, thereby changing the period of image sensing by the radiation image sensing apparatus 100 and the period of radiation emission by the radiation source 104. This means changing the frame rate in the image sensing operation of the radiation image sensing apparatus 100 by changing the period of the synchronization signal SYNC.

The radiation image sensing apparatus 100 includes an image sensor IS and a controller 109. If the frame rate defined by the synchronization signal SYNC is lower than a predetermined frame rate, the controller 109 causes the image sensor IS to perform not only the image sensing operation of sensing a radiation image but also a temperature controlling operation of generating additional heat other than heat generated by the image sensing operation. Here, the controller 109 causes the image sensor IS to perform the temperature controlling operation so as to reduce a change in the temperature of the image sensor IS caused by the change in the frame rate defined by the synchronization signal SYNC. The predetermined frame rate is a frame rate set in, for example, the system control unit 101. Information for specifying the predetermined frame rate can be provided from the system control unit 101 to the controller 109 of the radiation image sensing apparatus 100.

The image sensor IS includes a pixel array PA including a plurality of pixels, and readout circuits RC configured to read out, from the pixel array PA, signals that form a radiation image. Each of the plurality of pixels of the pixel array PA includes a conversion element that converts radiation into an electric signal, and an in-pixel readout circuit that outputs a signal corresponding to the electric signal converted by the conversion element. The conversion element and the in-pixel readout circuit will be described later. The temperature controlling operation can include an operation of causing the in-pixel readout circuit to consume additional power other than power consumed by the in-pixel readout circuit in the image sensing operation.

For example, the pixel array PA can be formed from an array of a plurality of image sensing units 106, and a scintillator that covers the array of the plurality of image sensing units 106. Each image sensing unit 106 is formed from, for example, a CMOS image sensor and can include an array of a plurality of pixels. The plurality of image sensing units 106 can be arranged such that the array pitch of the pixels in each image sensing unit 106 equals the pixel pitch between the adjacent image sensing units 106. Referring to FIG. 1, terminals (electrode pads) (not shown) formed on the image sensing units 106 are arranged on the upper and lower sides of the pixel array PA. The terminals can be connected to the readout circuits RC via, for example, flying lead print circuit boards (not shown).

The readout circuits RC can include analog multiplexers 131 to 138, differential amplifiers 141 to 148, and A/D converters 151 to 158. Each of the analog multiplexers 131 to 138 selects output signals from the image sensing units 106 connected to it, and outputs the selected output signals to a corresponding differential amplifier. For example, the analog multiplexer 131 selects output signals from the plurality of image sensing units 106 connected to it, and outputs the output signals to the differential amplifier 141 connected to the analog multiplexer 131. The plurality of image sensing units 106 connected to one analog multiplexer constitute a block. The A/D converters 151 to 158 convert analog image signals provided from the differential amplifiers 141 to 148 into digital image data in accordance with a synchronization clock provided from the controller 109, and provide the digital image data to the controller 109. The controller 109 composites the digital image data of the respective blocks, which are provided from the A/D converters 151 to 158, to generate frame data (radiation image data), and transmits it to the system control unit 101.

The controller 109 can be configured to execute dummy image sensing in a state in which the radiation image sensing apparatus 100 is not irradiated with radiation, and store thus obtained frame data as an offset image. The controller 109 can be configured to correct, based on the offset image, a plurality of frame data (radiation images) sensed in a state in which the apparatus is irradiated with radiation and output the frame data. This correction function may be provided in the system control unit 101. Since offset components that can be included in a plurality of frame data (radiation images) obtained in control with the temperature controlling operation are almost equal to each other, the offset image can commonly be used in correction of the plurality of frame data.

The system control unit 101 and the controller 109 of the radiation image sensing apparatus 100 can be connected by a control interface 110, an image data interface 111, a READY signal line 112, a synchronization signal line 113, and an exposure permission signal line 114. The system control unit 101 can set an image sensing mode, a frame rate (including the highest frame rate if the frame rate changes), various parameters (for example, accumulation time), and the like in the controller 109 via the control interface 110. The controller 109 can transmit information representing the state of the radiation image sensing apparatus 100 and the like to the system control unit 101 via the control interface 110. The controller 109 can transmit radiation image data obtained by image sensing to the system control unit 101 via the image data interface. The controller 109 can notify, via the READY signal line 112, the system control unit 101 that the radiation image sensing apparatus 100 is set in an image sensing enable state. Upon receiving a READY signal from the controller 109 via the READY signal line 112, the system control unit 101 can transmit the synchronization signal SYNC to the controller 109 via the synchronization signal line 113. The controller 109 can transmit an exposure permission signal to the system control unit 101 via the exposure permission signal line 114. In an enable state of the exposure permission signal, the system control unit 101 can transmit an exposure signal to the radiation source control unit 103 and cause the radiation source 104 to emit radiation. The radiation emitted by the radiation source 104 and transmitted through a subject enters the pixel array PA of the radiation image sensing apparatus 100. Charges corresponding to the intensity distribution of the radiation are accumulated in the plurality of pixels of the pixel array PA. A radiation image can be generated by reading out the charges.

Figure 2:
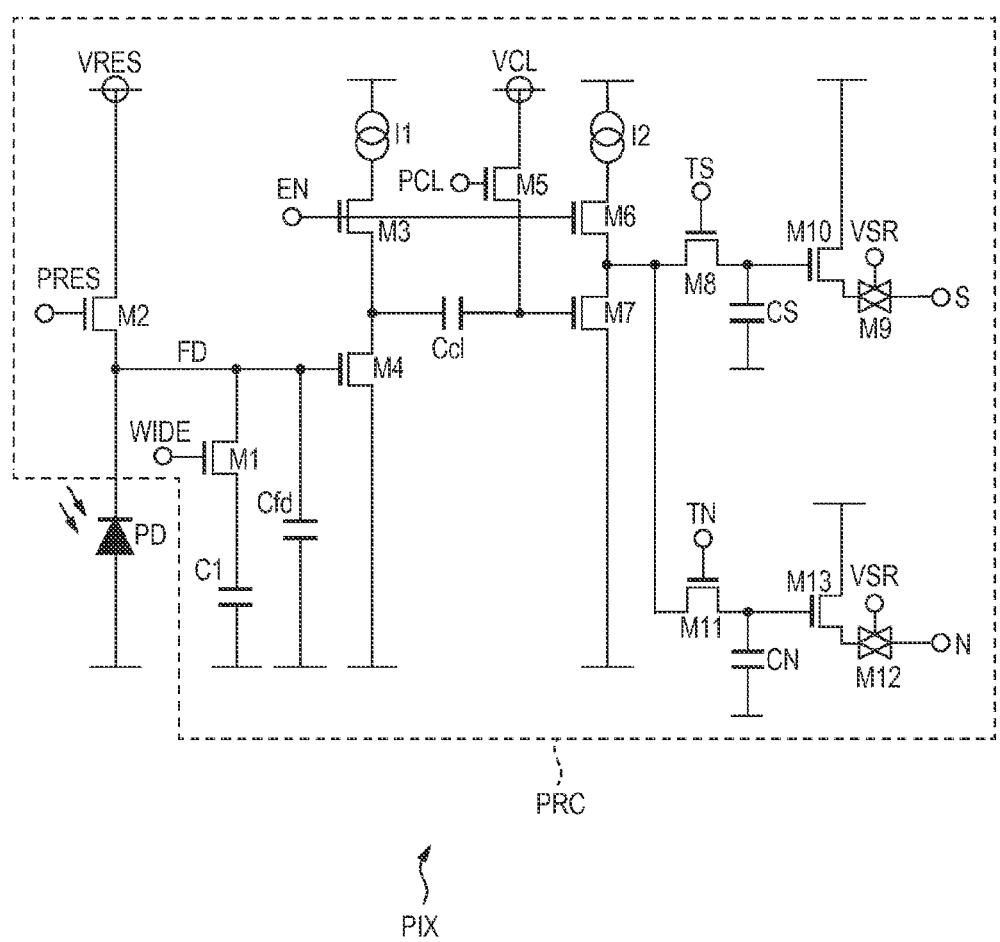
FIG. 2 is a circuit diagram showing the arrangement of one pixel included in a pixel array.

FIG. 2 shows the arrangement of one pixel PIX included in the pixel array PA. As described above, the pixel array PA is formed from the array of the plurality of image sensing units 106, and the scintillator that covers the array. Each image sensing unit 106 can include an array of a plurality of pixels PIX. The pixel PIX can include a photodiode PD serving as a photoelectric conversion element, and an in-pixel readout circuit PRC that outputs a signal corresponding to an electric signal converted by the photoelectric conversion element. The scintillator converts radiation into visible light, and the photoelectric conversion element converts the visible light into an electric signal (charges). The scintillator and the photoelectric conversion element constitute a conversion element that converts radiation into an electric signal. Instead of this example, a conversion element that directly converts radiation into an electric signal may be employed.

The in-pixel readout circuit PRC can include MOS transistors M1 to M13, capacitors C1, Cfd, Cc1, CS, and CN, current sources I1 and I2, and a floating diffusion FD. The floating diffusion FD includes the capacitor Cfd. The MOS transistors M1 to M13 can be referred to by names according to the individual functions hereinafter. The reset switch M2 is a switch used to remove charges generated by photoelectric conversion and accumulated in the floating diffusion FD (capacitor Cfd). The sensitivity changeover switch M1 is a switch that switches between a low sensitivity mode (high dynamic range mode) and a high sensitivity mode. The capacitor C1 is used to widen the dynamic range. When the sensitivity changeover switch M1 is turned on, the capacitor C1 is connected to the floating diffusion FD to enable charge accumulation. When the sensitivity changeover switch M1 is turned on, the capacity of the floating diffusion FD increases, and the dynamic range widens, although the sensitivity lowers. Hence, for example, the sensitivity changeover switch M1 is turned off in a fluoroscopy mode where a high sensitivity is necessary, and turned on in a DSA mode where a high dynamic range is necessary.

The amplifier transistor (first pixel amplifier) M4 is connected in series with the current source I1 and operates as a source follower amplifier together with the current source I1. The enable switch M3 is a switch configured to set the current source I1 and the amplifier transistor M4 in an operative state. When the enable switch M3 is turned on in accordance with an enable signal EN, the current source I1 and the amplifier transistor M4 are set in the operative state.

A clamp circuit that removes kTC noise generated in the photodiode PD is provided at the subsequent stage of the amplifier transistor M4. The clamp circuit includes a clamp capacitor Cc1 and the clamp switch M5. The amplifier transistor (second pixel amplifier) M7 is connected in series with the current source I2 and operates as a source follower amplifier together with the current source I2. The enable switch M6 is a switch configured to set the current source I2 and the amplifier transistor M7 in an operative state. When the enable switch M6 is turned on in accordance with the enable signal EN, the current source I2 and the amplifier transistor M7 are set in the operative state.

Two sample and hold circuits are provided at the subsequent stage of the amplifier transistor M7. The switch M8 and the capacitor CS form a sample and hold circuit that holds an optical signal. The capacitor CS is a capacitor configured to hold an optical signal. The switch M11 and the capacitor CN form a sample and hold circuit that holds a noise signal. The capacitor CN is a capacitor configured to hold a noise signal. The amplifier transistor (third pixel amplifier) M10 operates as a source follower. The switch M9 is an analog switch (transmission switch) configured to output an optical signal amplified by the amplifier transistor M10 to an S signal line. The amplifier transistor (third pixel amplifier) M13 operates as a source follower. The switch M12 is an analog switch (transmission switch N) configured to output a noise signal amplified by the amplifier transistor M13 to an N signal line.

The enable signal EN is a control signal supplied to the gates of the enable switches M3 and M6 to set the amplifier transistors M4 and M7 in the operative state. When the enable signal EN changes to high level (active level, that is, active state), the current sources I1 and I2 supply currents, and the amplifier transistors M4 and M7 are set in the operative state. A sensitivity changeover signal WIDE is supplied to the gate of the sensitivity changeover switch M1. When the sensitivity changeover signal WIDE changes to low level, the sensitivity changeover switch M1 is turned off to set a high sensitivity mode. A reset signal PRES turns on the reset switch M2 to remove charges accumulated in the photodiode PD. A clamp signal PCL is supplied to the gate of the clamp switch M5. When the clamp signal PCL changes to high level, the clamp switch M5 is turned on to set one terminal of the clamp capacitor Cc1 to a reference voltage VCL.

An SH control signal TS for controlling sample and hold of an optical signal is supplied to the gate of the switch M8. When the SH control signal TS changes to high level, the switch M8 is turned on to transmit the optical signal to the capacitor CS via the amplifier transistor M7. Next, when the SH control signals TS of all pixels change to low level, and the switches M8 are accordingly turned off, holding of the optical signal charges in the sample and hold circuit is completed. An SH control signal TN for controlling sample and hold of a noise signal is supplied to the gate of the switch M11. When the SH control signal TN changes to high level, the switch M11 is turned on to transmit the noise signal to the capacitor CN via the amplifier transistor M7. Next, when the SH control signals TN of all pixels change to low level, and the switches M11 are accordingly turned off, holding of the noise signal charges in the sample and hold circuit is completed. After the sample and hold by the capacitors CS and CAN, the switches M8 and M11 are turned off, and the capacitors CS and CN are disconnected from the circuits of the preceding stage.

Figure 3:
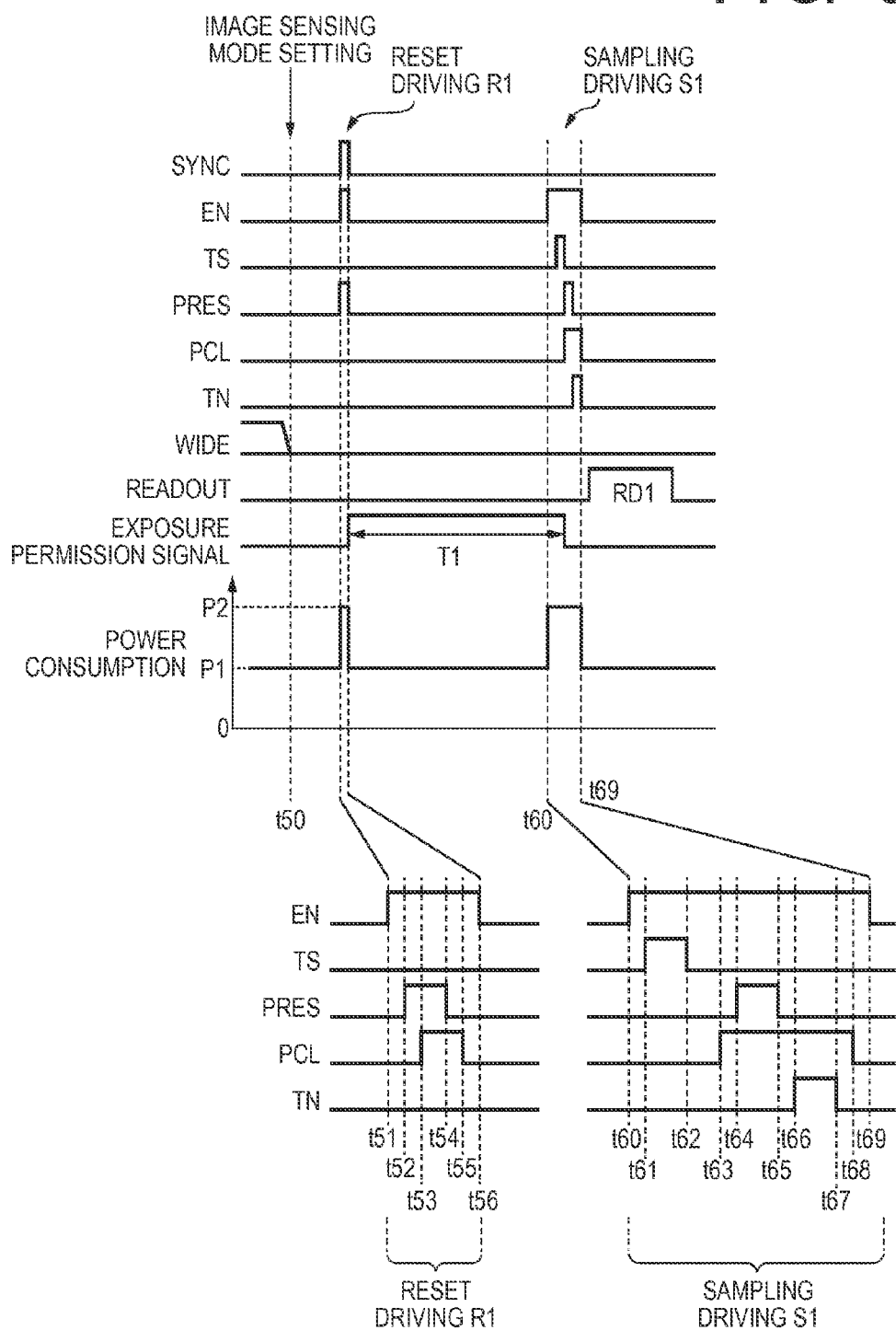
FIG. 3 is a timing chart showing the operation of the pixel.

FIG. 3 shows the operation of the pixel PIX. An operation from accumulation of charges according to radiation to the sample and hold of the charges in the capacitor CS for holding an optical signal and the capacitor CN for holding a noise signal will be described with reference to FIG. 3. When the pixel array PA is formed from the array of the plurality of image sensing units 106, the plurality of image sensing units 106 can be controlled at the same timing.

At time t50, the image sensing mode (sensitivity) is set. After that, when the synchronization signal SYNC is detected, driving for image sensing starts from time t51. In this example, the synchronization signal SYNC is provided from the system control unit 101 to the controller 109 of the radiation image sensing apparatus 100. However, the synchronization signal SYNC may be generated by the radiation image sensing apparatus 100 and provided to the system control unit 101.

Reset driving R1 (reset operation) starts from the time t51. The reset driving R1 is driving to perform reset and clamp. First, the controller 109 changes the enable signal EN to high level to set the current sources I1 and I2 in the operative state at the time t51. Setting the current source I1 in the operative state means establishing a current path between two voltage lines (for example, a power supply line and a ground line). Similarly, setting the current source I2 in the operative state means establishing a current path between two voltage lines (for example, a power supply line and a ground line). Setting the current source I1 in the operative state means setting the amplifier circuit formed from the current source I1 and the amplifier transistor M4 in the operative state. Setting the current source I2 in the operative state means setting the amplifier circuit formed from the current source I2 and the amplifier transistor M7 in the operative state. Let P1 be power consumption of the image sensor IS when the current sources I1 and I2 are in an inoperative state, and P2 be power consumption of the image sensor IS when the current sources I1 and I2 are in the operative state. When the enable signal EN is set to high level (that is, an enable state), the power consumption of the image sensor IS rises from P1 to P2.

At time t52, the controller 109 changes the reset signal PRES to high level, and resets the photodiode PD to a voltage corresponding to a reference voltage VRES. At time t53, the controller 109 changes the clamp signal PCL to high level, thereby turning on the clamp switch M5. The voltage of the output-side terminal of the clamp capacitor Cc1 is thus reset to a voltage corresponding to the reference voltage VCL. At time t54, the controller 109 changes the reset signal PRES to low level, thereby ending the reset. The voltage of the floating diffusion FD at this time is a reset voltage. At time t55, the controller 109 changes the clamp signal PCL to low level, thereby turning off the clamp switch M5. Accordingly, charges corresponding to the difference voltage between the reference voltage VCL and the reference voltage VRES are accumulated in the clamp capacitor Cc1, and the clamp ends. After that, the controller 109 changes the enable signal EN to low level. Accordingly, the current sources I1 and I2 are set in the inoperative state, and the power consumption of the radiation image sensing apparatus 100 changes from P2 to P1. The reset driving R1 thus ends. The reset driving R1 is performed simultaneously for all pixels PIX.

Charge accumulation by the photodiode PD and the capacitor Cfd of the floating diffusion FD starts from the time t54. The charges correspond to the amount of visible light that is converted from radiation by the scintillator and enters the photodiode PD. After the reset driving R1, the controller 109 enables the exposure permission signal to permit (request) radiation exposure. Subsequent reset driving is also controlled by this timing. In response to enabling of the exposure permission signal, the radiation source control unit 103 causes the radiation source 104 to emit radiation.

The radiation emitted by the radiation source 104 and transmitted through the subject irradiates the radiation image sensing apparatus 100. By radiation irradiation, the photodiode PD of each pixel PIX generates charges, and the charges are accumulated in the capacitor Cfd (or the capacitors Cfd and C1) of the floating diffusion FD. From the time t52 to t54, the reset signal PRES of high level is applied to the photodiode PD, thereby generating reset noise (kTC noise). The reset noise is removed by setting the reference voltage VCL in the output terminal of the clamp capacitor Cc1 of the clamp circuit.

Sampling driving 31 from time t60 to t69 will be described below. At the time t60, the controller 109 changes the enable signal EN to high level to turn on the enable switches M3 and M6, thereby setting the current sources I1 and I2 in the operative state. A voltage corresponding to the amount of charges accumulated in the capacitor Cfd (or capacitors Cfd and C1) is output from the amplifier transistor M4 to the input terminal of the clamp capacitor Cc1. The output from the amplifier transistor M4 includes reset noise. However, since the output terminal of the clamp capacitor Cc1 is set to the voltage VCL at the time of reset, the output is provided to the amplifier transistor M7 as an optical signal from which the reset noise has been removed.

At the time t61, the controller 109 changes the sample and hold control signal TS to high level, thereby turning on the switch M8. The optical signal can thus be transmitted to the optical signal holding capacitor CS via the amplifier transistor M7. After the time t61, the exposure permission signal can be driven to a disable state. At the time t62, the controller 109 changes the optical signal sample and hold control signal TS to low level, thereby turning off the switch M8. The optical signal is thus sampled and held by the optical signal holding capacitor CS.

At the time t63, the controller 109 changes the clamp signal PCL to high level. Next, at the time t64, the controller 109 changes the reset signal PRES to high level, thereby turning on the reset switch M2 and resetting the capacitor Cfd (or capacitors Cfd and C1) to a voltage according to the reference voltage VRES. Charges corresponding to the difference voltage between the voltage VCL and the voltage VRES on which the reset noise is superimposed are thus accumulated in the clamp capacitor Cc1. At the time t65, the controller 109 changes the reset signal PRES to low level, thereby completing the reset. At the time t66, the controller 109 changes the sample and hold control signal TN to high level, thereby turning on the switch M11. A noise signal when setting a voltage according to the reference voltage VCL is thus transmitted to the noise signal holding capacitor CN. At the time t67, the controller 109 changes the sample and hold control signal TN to low level, thereby turning off the switch M11. The noise signal is thus sampled and held by the noise signal holding capacitor CN. At the time t68, the controller 109 changes the clamp signal PCL to low level. At the time t69, the controller 109 changes the enable signal EN to low level, thereby setting the current sources I1 and I2 in the inoperative state. Accordingly, the amplifier transistors M4 and M7 are also set in the inoperative state. The sampling driving S1 thus ends. The sampling driving S1 is performed simultaneously for all pixels PIX.

During the periods of the reset driving R1 and the sampling driving S1, the power consumption of the image sensor IS is P2. During the remaining periods, the power consumption of the image sensor IS is P1.

Readout of the optical signal and the noise signal from the pixel PIX is performed by turning on the switches M9 and M12 and outputting voltages corresponding to the voltages of the capacitors CS and CN to an optical signal output line and a noise signal output line via the amplifier transistors M10 and M13. The signals output to the noise signal output line and the optical signal output line are provided to the differential amplifiers 141 to 148 shown in FIG. 1 connected to the noise signal output line and the optical signal output line. Each of the differential amplifiers 141 to 148 outputs a signal obtained by differential amplification of the signals input via the noise signal output line and the optical signal output line. Accordingly, thermal noise, 1/f noise, temperature difference, and FPN (flat pattern noise) caused by a process variation in the first, second, and third pixel amplifiers (M4, M7, and M9/M13) are removed. Note that the period in which signal readout from the pixel PIX is possible is the period from the end (time t67) of sample and hold by the capacitor CN to resumption (time t61) of sample and hold of the optical charge signal of the next frame by the capacitor CN. After the end of the sampling driving S1, readout processing RD1 of signals from the plurality of pixels PIX is performed. The readout processing RD1 can be performed immediately after sample and hold so as to make the delay until image display as short as possible.

In the pixel PIX shown in FIG. 2, the start of charge accumulation in the photodiode PD is determined by the reset driving R1 or sampling driving S1. More specifically, charge accumulation starts at the time (time t55 or t68) when the reset signal PRES for determining the optical signal to be detected is driven to low level, and the clamp signal PCL is driven to low level to complete the clamp. The timing of the end of charge accumulation is the time (time t62) when the optical signal sample and hold control signal TS is changed to low level to sample and hold the optical signal. Hence, the accumulation time can be limited by inserting the reset driving R1 or sampling driving S1 to define the start of the accumulation time between the sampling driving S1 and the sampling driving S1 to sample and hold the optical signal and the noise signal.

Figure 4:
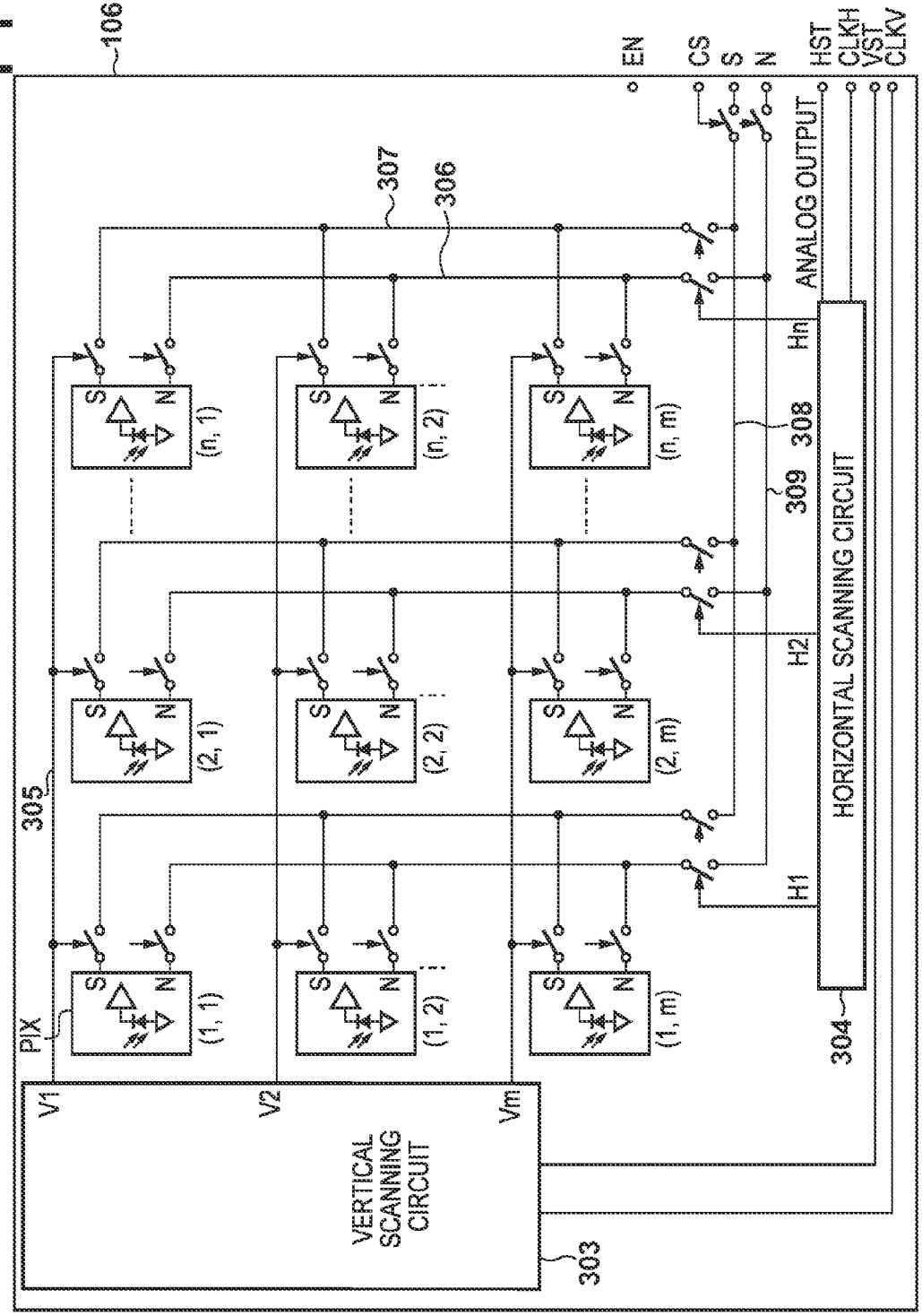
FIG. 4 is a block diagram showing an image sensing unit included in the pixel array.

FIG. 4 shows the arrangement of the image sensing unit 106. The image sensing unit 106 includes, as a terminal group, terminals for a chip select signal CS, an optical signal output S, a noise signal output N, a vertical scanning start signal VST, a vertical scanning clock CLKV, a horizontal scanning start signal HST, a horizontal scanning clock CLKH, and the enable signal EN. The enable signal EN is a signal supplied to the enable switches M3 and M6 of the pixel PIX. The image sensing unit 106 includes, as circuits, a pixel block including a plurality of pixels PIX arrayed to form a plurality of rows and a plurality of columns, a vertical scanning circuit 303, a horizontal scanning circuit 304, and the like.

The vertical scanning circuit 303 selects a row in the pixel block. This selection is done by a method of scanning the pixel block in the vertical direction that is the sub-scanning direction in synchronism with the vertical scanning clock CLKV. The horizontal scanning circuit 304 selects a column in the pixel block. This selection is done by a method of scanning the row selected by the vertical scanning circuit 303 in the horizontal direction that is the main scanning direction in synchronism with the horizontal scanning clock CLKH. That is, the pixels of the row selected by the vertical scanning circuit 303 are sequentially selected. A control signal VSR for controlling the switches M9 and M12 of the pixel PIX is supplied via a row signal line 305 that is an output line of the vertical scanning circuit 303. When the control signal (selection signal) VSR supplied via the row signal line 305 is enabled, the optical signal voltage signal S and the noise voltage signal N are output to column signal lines 306 and 307. When the horizontal scanning circuit 304 sequentially selects the voltage signals output to the column signal lines 306 and 307, the voltage signals of the pixels are sequentially output to analog output lines 308 and 309.

As described above, the image sensing unit 106 selects the pixel PIX by a switching operation based on an XY address method using the vertical scanning circuit 303 and the horizontal scanning circuit 304. The voltage signals of the optical signal S and the noise signal N read out from the selected pixel PIX are output to the analog output terminals S and N via the column signal lines 306 and 307 and the analog output lines 308 and 309. When the chip select signal CS is driven to high level, the image sensing unit 106 to which the chip select signal CS is supplied is selected, and the optical voltage signal S and the noise voltage signal N of the pixel PIX selected by the vertical scanning circuit 303 and the horizontal scanning circuit 304 are output from the analog output terminals S and N.

The vertical scanning clock CLKV is supplied to the vertical scanning circuit 303. The vertical scanning start signal VST is supplied to the vertical scanning circuit 303. After the vertical scanning start signal VST is changed to high level, the vertical scanning clock CLKV is input. Accordingly, row selection signals V1, V2, . . . , Vm output to the row signal lines 305 are sequentially driven to enable. When vertical scanning starts, the vertical scanning start signal VST is changed to low level. The horizontal scanning clock CLKH is supplied to the horizontal scanning circuit 304, and the horizontal scanning start signal HST is supplied to the start signal of the horizontal scanning circuit 304. The horizontal scanning start signal HST is changed to high level, and the horizontal scanning clock CLKH is input. Accordingly, column selection signals H1, H2, . . . , Hn are sequentially driven to enable. When horizontal scanning starts, the horizontal scanning start signal HST is driven to low level.

When the row selection signal V1 of the vertical scanning circuit 303 is enabled, pixels PIX(1, 1) to PIX(n, 1) of the first row to which the row selection signal V1 is supplied are selected. The optical voltage signals S and the noise voltage signals N are output from the pixels PIX(1, 1) to PIX(n, 1) of the first row to the column signal lines 306 and 307. When the column selection signals H1, H2, . . . , Hn of the horizontal scanning circuit 304 are sequentially enabled, the optical voltage signals S and the noise voltage signals N of the first row are sequentially output to the analog output terminals S and N via the analog output lines 308 and 309. By performing this operation up to the row selection signal Vm, the signals of all pixels PIX are output.

Figure 5:
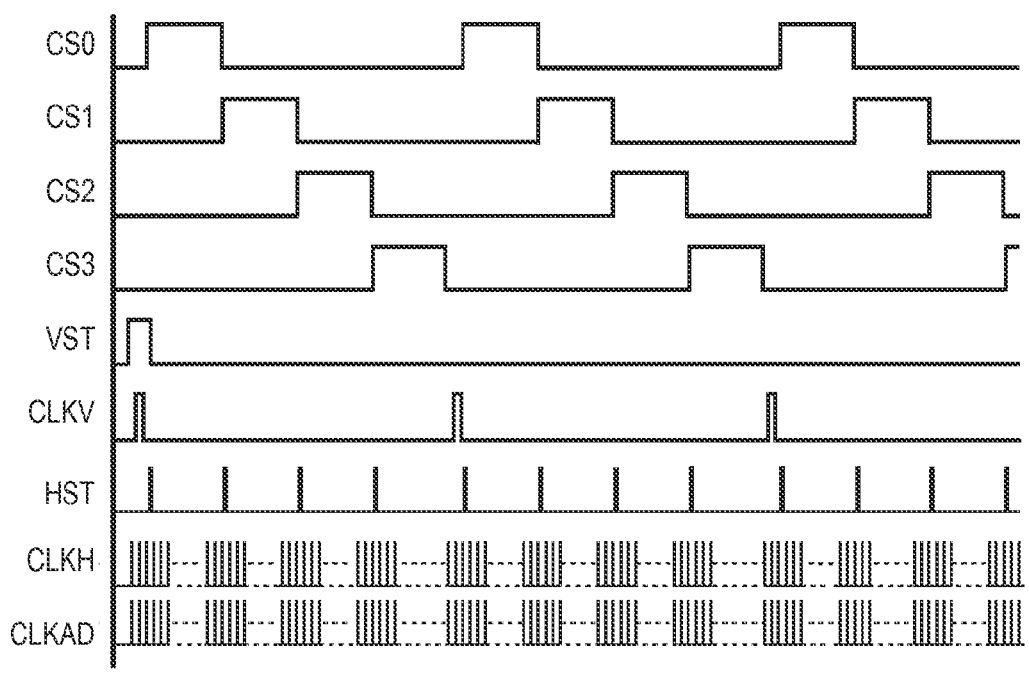
FIG. 5 is a timing chart showing the readout operation of signals from a plurality of image sensing units.

FIG. 5 shows the readout operation of signals from four image sensing units 106. CS0 to CS3 are chip select signals CS that control the output of analog signals from the four image sensing units 106, in which 0 to 3 of CS0 to CS3 are identifiers used to discriminate the four image sensing units 106 from each other. First, when the chip select signal CS0 is enabled, and the vertical scanning clock CLKV rises in the high level state of the vertical scanning start signal VST, the row selection signal V1 of the first row of the vertical scanning circuit 303 of the image sensing unit 106 to which the chip select signal CS0 is supplied is enabled. Accordingly, the signals of the pixels PIX(1, 1) to PIX(n, 1) of the first row are output to the column signal lines 306 and 307. When the horizontal scanning clock CLKH rises in the high level state of the horizontal scanning start signal HST, the column selection signal H1 of the horizontal scanning circuit 304 is enabled. The column selection signals H2, . . . , Hn of the horizontal scanning circuit 304 are sequentially output in synchronism with the leading edge of CLKH, and accordingly, the output of the pixels PIX(1, 1) to PIX(n, 1) are sequentially selected. An A/D converter (for example, A/D converter 132) performs A/D conversion based on an A/D conversion clock CLKAD that synchronizes with the horizontal scanning clock CLKH. Next, the signal is switched to the chip select signal CS1, and horizontal scanning is similarly performed. Horizontal scanning is also similarly performed for the chip select signals CS2 and CS3. Signal readout from the pixels PIX of the first rows of the four image sensing units 106 thus ends. From then on, horizontal scanning is performed up to Vm while sequentially enabling the row selection signals of the vertical scanning circuit 303 by CLKV, thereby completing signal readout from all pixels of the four image sensing units 106.

Figure 8:
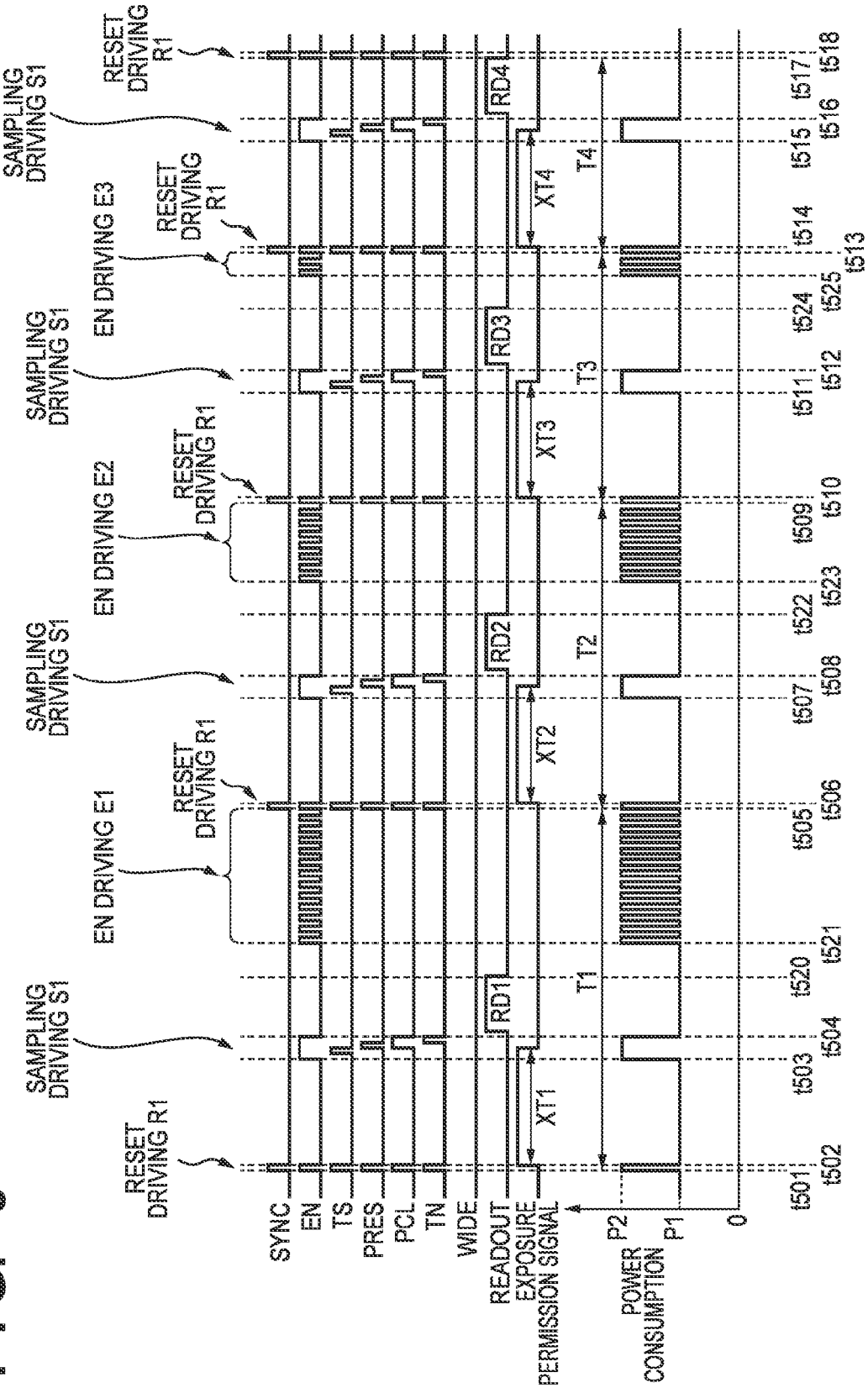
FIG. 8 is a timing chart showing an operation according to the embodiment in a case in which a frame rate changes in continuous sensing of a plurality of radiation images.

FIG. 8 shows an operation in a case in which the frame rate changes in continuous sensing of a plurality of radiation images. Here, in image sensing of each frame, the period during which the exposure permission signal is enabled is constant. A change in the frame rate can occur in, for example, a C-arm radiation image sensing system to be described later.

Upon detecting the synchronization signal SYNC, the controller 109 of the radiation image sensing apparatus 100 starts the reset driving R1. At time t501, the controller 109 changes the enable signal EN to high level. Since the current sources I1 and I2 of each pixel in the plurality of image sensing units 106 of the pixel array PA are set in the operative state, the power consumption of the image sensor IS rises from P1 to P2. After that, at time t502, the controller 109 changes the enable signal EN to low level to end the reset driving R1. Since the current sources I1 and I2 of each pixel in the plurality of image sensing units 106 of the pixel array PA are set in the inoperative state, the power consumption of the image sensor IS lowers from P2 to P1. Next, the controller 109 enables the exposure permission signal. This means requesting the radiation source control unit 103 to cause the radiation source 104 to emit radiation. The same operation as described above is performed in the reset driving R1 to be executed later.

After the elapse of a sufficient time for charge accumulation from the reset driving R1, at time t503, the controller 109 changes the enable signal EN to high level to start the sampling driving S1. Since the current sources I1 and I2 of each pixel in the plurality of image sensing units 106 of the pixel array PA are set in the operative state, the power consumption of the image sensor IS rises from P1 to P2. After that, at time t504, the controller 109 changes the enable signal EN to low level to end the sampling driving S1. Since the current sources I1 and I2 of each pixel in the plurality of image sensing units 106 of the pixel array PA are set in the inoperative state, the power consumption of the image sensor IS lowers from P2 to P1. Note that the sampling driving S1 can be performed simultaneously for all pixels PIX of the pixel array PA.

After the end of the sampling driving S1, the controller 109 executes the readout processing RD1 of signals from the pixel array PA. The readout processing RD1 can be performed immediately after sample and hold so as to make the delay until image display as short as possible.

When the readout processing RD1 ends at time t520, at time t521 after the elapse of the waiting time, the controller 109 starts an operation (temperature controlling operation) of turning on/off the enable signal EN, and repeats this operation until the synchronization signal SYNC is detected. This operation is executed when the frame rate according to the synchronization signal SYNC is lower than the predetermined frame rate, and performed to increase heat generated by the image sensor IS or the radiation image sensing apparatus 100. That is, when the frame rate according to the synchronization signal SYNC is lower than the predetermined frame rate, the controller 109 causes the image sensor IS to perform the temperature controlling operation of generating additional heat other than heat generated by the image sensing operation in addition to the image sensing operation of sensing a radiation image. The waiting time can be determined not to execute the temperature controlling operation if the frame rate according to the synchronization signal SYNC equals the predetermined frame rate.

The temperature controlling operation can include an operation of turning on/off the enable signal EN at a predetermined duty ratio and a predetermined period. The first temperature controlling operation is represented by "EN driving E1" in FIG. 8. The temperature controlling operation is not limited to setting the current sources I1 and I2 in the operative state by changing the enable signal EN to the enable state. For example, the temperature controlling operation can be implemented by setting a dedicated circuit configured to raise the temperature in the operative state or setting a circuit that raises the temperature but does not impede the image sensing operation in the operative state.

By the temperature controlling operation, the power consumption of the image sensor IS (or radiation image sensing apparatus 100) can be increased, and the temperature of the image sensor IS (or radiation image sensing apparatus 100) can be raised. This can make the temperature of the image sensor IS when the radiation image sensing apparatus 100 senses a radiation image at a frame rate lower than the predetermined frame rate close to the temperature of the image sensor IS when the radiation image sensing apparatus 100 senses a radiation image at the predetermined frame rate. That is, in the image sensing operation in which the frame rate of the image sensing by the radiation image sensing apparatus 100 changes, a change in the temperature of the image sensor IS or radiation image sensing apparatus 100 can be suppressed by executing the temperature controlling operation in part of the period during which the frame rate is lower than the predetermined frame rate. This is advantageous in suppressing a change in the magnitude of noise caused by the change in the temperature of the image sensor IS or radiation image sensing apparatus 100 and reducing degradation of image quality. The time during which the enable signal EN is set in the enable state (active state) (that is, the time during which the current sources I1 and I2 are enabled) in the temperature controlling operation can be determined such that the change in the enable ratio caused by the change in the frame rate is reduced. The enable ratio is a time during which the enable signal EN is enabled per unit time. That is, the enable ratio is determined such that the change in the temperature of the image sensor IS or radiation image sensing apparatus 100 caused by the change in the frame rate is reduced, for example, the enable ratio becomes constant regardless of the change in the frame rate.

Upon detecting the synchronization signal SYNC at time t505, the controller 109 stops the temperature controlling operation (EN driving E1) and starts the reset driving R1. After the elapse of a sufficient time for charge accumulation from the end of the reset driving R1 at time t506, at time t507, the controller 109 changes the enable signal EN to high level to start the sampling driving S1. Since the current sources I1 and I2 of each pixel in the plurality of image sensing units 106 of the pixel array PA are set in the operative state, the power consumption of the image sensor IS rises from P1 to P2. After that, at time t508, the controller 109 changes the enable signal EN to low level to end the sampling driving S1. Since the current sources I1 and I2 of each pixel in the plurality of image sensing units 106 of the pixel array PA are set in the inoperative state, the power consumption of the image sensor IS lowers from P2 to P1. After that, the controller 109 executes readout processing RD2 of signals from the pixel array PA.

When the readout processing RD2 ends at time t522, at time t523 after the elapse of the waiting time, the controller 109 starts the temperature controlling operation, and repeats this operation until the synchronization signal SYNC is detected. This operation is represented by EN driving E2 in FIG. 8. In the example shown in FIG. 8, the frame rate increases. That is, the period of the synchronization signal SYNC gradually shortens, as represented by T1>T2>T3>T4. Hence, the number of toggles (number of pulses) of the enable signal EN in the temperature controlling operation gradually decreases. When the time during which the enable signal EN is driven to high level is controlled in accordance with the frame rate, in other words, in accordance with the period of the synchronization signal SYNC, the power consumption of the image sensor IS per unit time can be controlled. Upon detecting the synchronization signal SYNC at time t509, the controller 109 stops the temperature controlling operation (EN driving E2) and starts the reset driving R1. From time t510 at which the reset driving R1 ends to time t513 at which the next synchronization signal SYNC is detected, the controller 109 executes the sampling driving S1, readout processing RD3, the temperature controlling operation (EN driving E3), and the reset driving R1. The effect of the temperature controlling operation is obtained by executing the temperature controlling operation in part of each frame period during which the frame rate is not the predetermined frame rate (highest frame rate) so as to reduce the change in the temperature of the image sensor IS or radiation image sensing apparatus 100. The frame period is a period defined by two continuous synchronization signals SYNC.

From time t513 to time t517 at which the next synchronization signal SYNC is detected, the sampling driving S1 and readout processing RD4 are performed, as described above. However, the temperature controlling operation is not executed because the synchronization signal SYNC is detected during the waiting time after the end of the readout processing RD4. The frame rate at this time almost equals the predetermined frame rate (highest frame rate) set in advance.

The frame rate is determined by a period T (that is, frame period) of the synchronization signal SYNC (T1, T2, T3, and T4 in FIG. 8). That is, let tR1 be the period of the reset driving R1, tS1 be the period of the sampling driving S1, and tEN be the period (that is, enable period) during which the enable signal EN in the temperature controlling operation is at high level. In this case, (tR1+tS1+tEN)/T preferably falls within an allowable range. More preferably, (tR1+tS1+tEN)/T is constant.

Normally, the above-described offset image data can depend on the temperature of the radiation image sensing apparatus 100. When the change in the temperature of the radiation image sensing apparatus 100 is reduced by controlling the enable signal EN in accordance with the frame rate, as described above, one offset image data can be applied to correct radiation image data at various frame rates.

Figure 9:
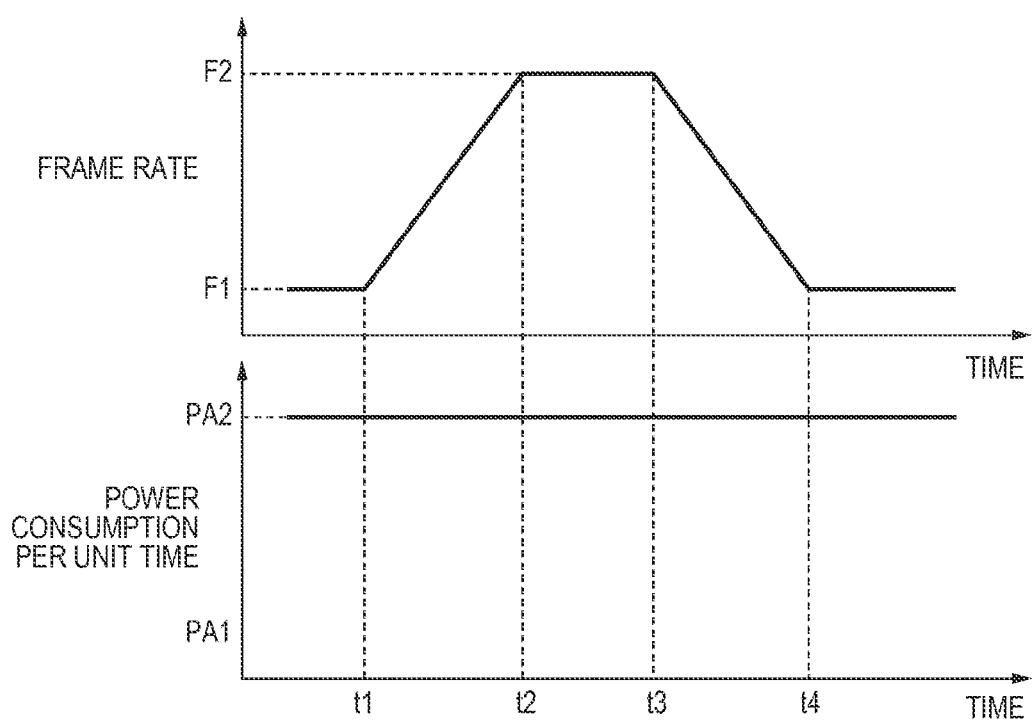
FIG. 9 is a timing chart showing a change in the frame rate and power consumption per unit time of the image sensor that operates at the frame rate.

FIG. 9 shows a change in the frame rate and power consumption per unit time of the image sensor IS that operates at the frame rate. By executing the temperature controlling operation, the power consumption per unit time of the image sensor IS is maintained at predetermined power consumption PA2.

In the above example, the temperature controlling operation is executed after the elapse of the waiting time from the end of the readout processing RD1. In another execution method, however, the temperature controlling operation may be executed immediately after the end of the readout processing RD1. Alternatively, the temperature controlling operation may be started during the accumulation time after the reset driving R1 and then stopped before the sampling driving S1.

Figure 10:
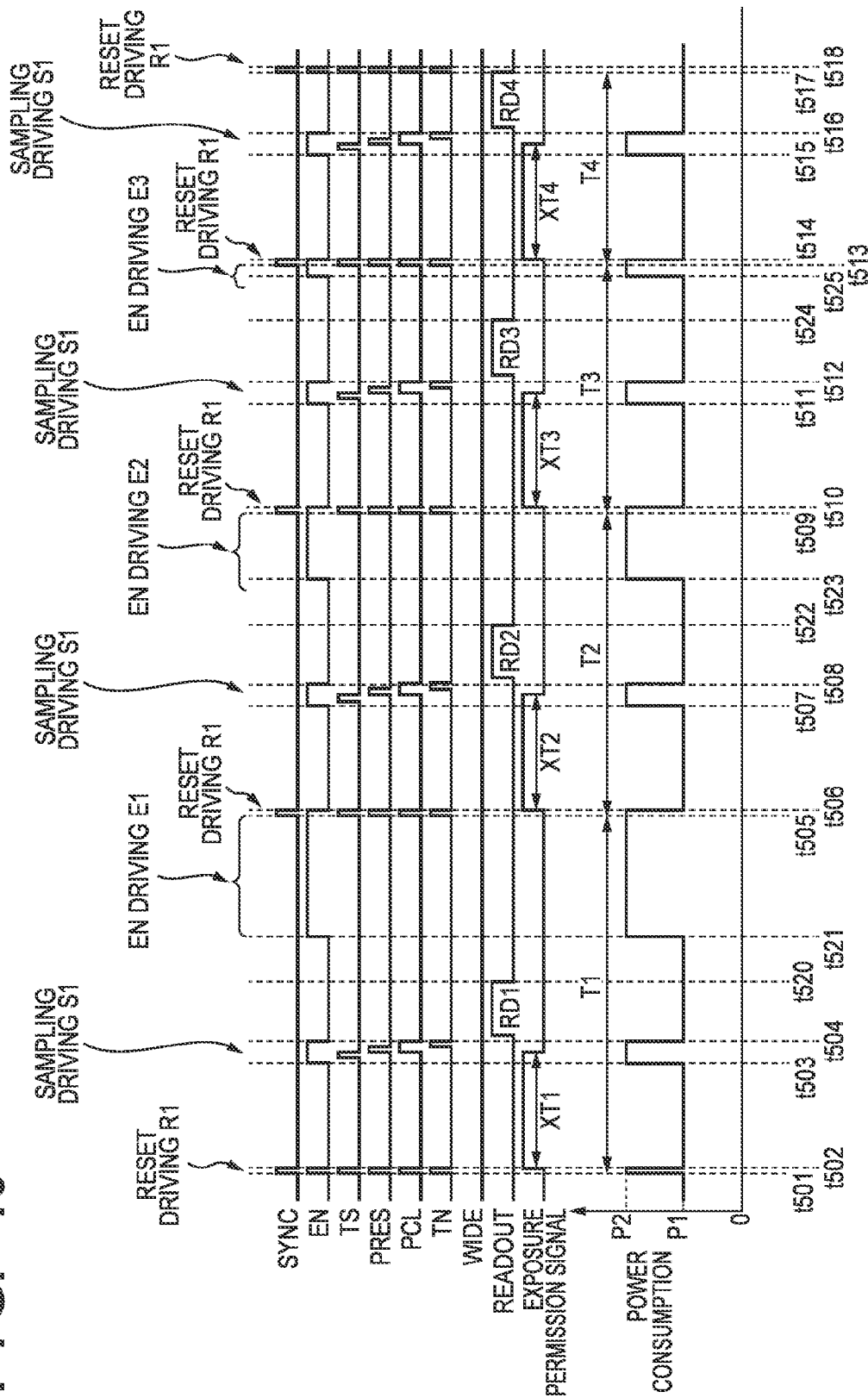
FIG. 10 is a timing chart showing an operation according to another embodiment in a case in which a frame rate changes in continuous sensing of a plurality of radiation images.

Otherwise, as shown in FIG. 10, the periods from t520 to t521, from t522 to t523, and from t524 to t525 may be controlled in accordance with the frame rate, and the enable signal EN may be kept at high level to control the power consumption per unit time of the image sensor IS. That is, the temperature controlling operation may be executed continuously in part of the frame period defined by two continuous synchronization signals SYNC.

Figure 6:
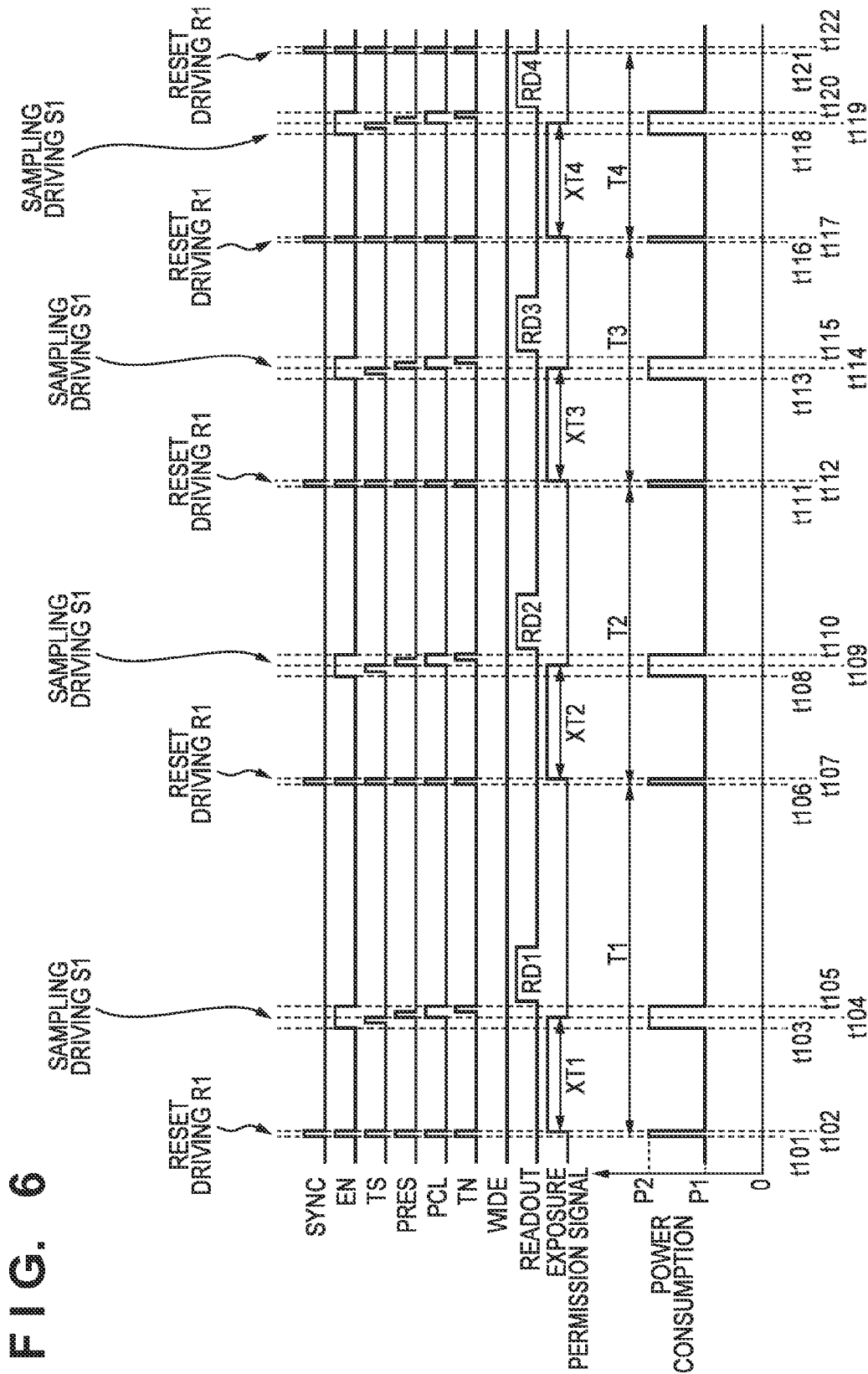
FIG. 6 is a timing chart showing a comparative example.
Figure 7:
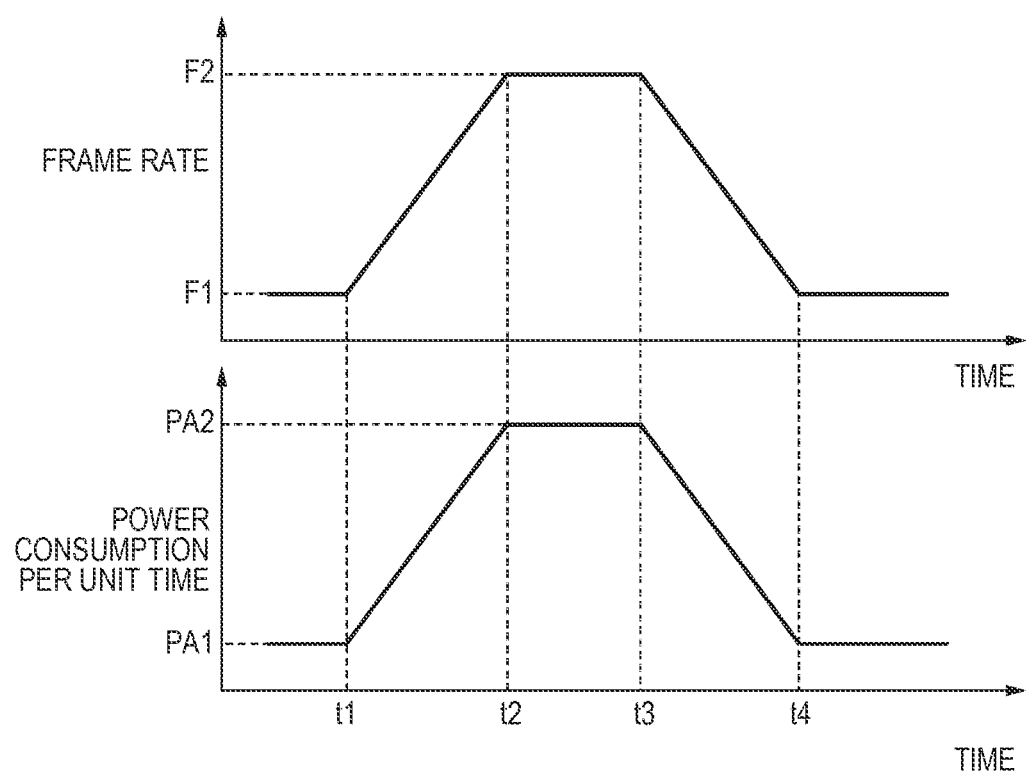
FIG. 7 is a timing chart showing a comparative example.

The operation of a radiation image sensing apparatus according to a comparative example will be described below with reference to FIG. 6. In this comparative example, the temperature controlling operation by controlling the enable signal EN is not performed. FIG. 7 shows a change in the frame rate according to the comparative example and power consumption per unit time of an image sensor that operates at the frame rate. In the comparative example, the power consumption per unit time changes in accordance with a change in the frame rate, as is apparent. For this reason, the temperature of the image sensor or radiation image sensing apparatus changes, and the magnitude of noise accordingly changes. Hence, the change in the frame rate can lead to degradation of image quality. Additionally, in the comparative example, since the temperature changes according to the frame rate, it may be necessary to acquire offset image data used to correct radiation image data for each frame rate or temperature.

In the above description, "power consumption of the image sensor IS" has correlation to "power consumption of the radiation image sensing apparatus 100". Hence, "power consumption of the image sensor IS" may be replaced with "power consumption of the radiation image sensing apparatus 100".

Figure 11:
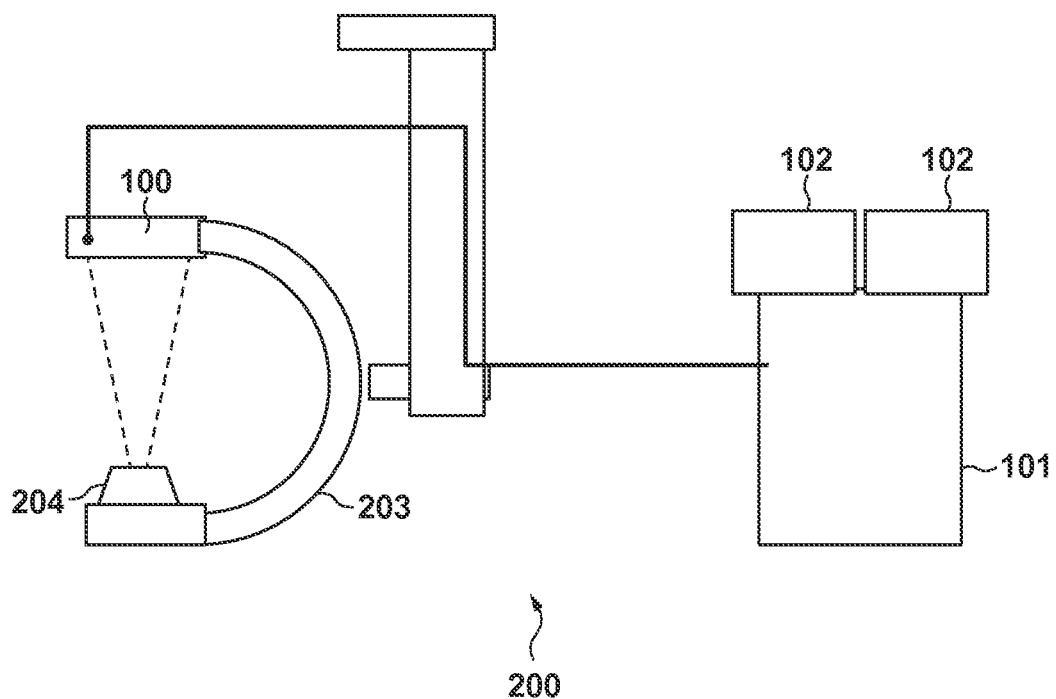
FIG. 11 is a view showing an application example of the radiation image sensing system.

An example in which the radiation image sensing system 1 is applied to a C-arm radiation image sensing system 200 will be described below with reference to FIG. 11. The radiation image sensing system 200 includes a radiation source 204 that emits radiation such as X-rays, the above-described radiation image sensing apparatus 100 that receives the radiation emitted from the radiation source 204 via a subject, the system control unit 101, and the image displaying unit 102. The radiation source 204 and the radiation image sensing apparatus 100 are arranged on a rotatable C arm 203 so as to face each other. By rotating the C arm 203 in a state in which the posture of the subject is not changed, the radiation irradiation direction to the subject can be changed. This enables 3D (three-dimensional) radiation image sensing. Each radiation image sensed by the radiation image sensing apparatus 100 is provided to the system control unit 101 and processed by the system control unit 101. The obtained 3D image can be output to the image displaying unit 102. Driving of the C arm 203 is done with acceleration and deceleration. Hence, the frame rate can be determined such that the subject is sensed at an equal angular interval independently of the acceleration and deceleration of the C arm 203 during rotation of the C arm 203.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-232940, filed Nov. 17, 2014, which is hereby incorporated by reference herein in its entirety.

What is claimed is:

1. A radiation image sensing apparatus comprising an image sensor configured to sense a plurality of radiation images at a frame rate according to a synchronization signal, and a controller configured to control the image sensor, wherein in a case in which the frame rate is lower than a predetermined frame rate, the controller causes the image sensor to perform a temperature controlling operation of generating additional heat other than heat generated by an image sensing operation in addition to the image sensing operation so as to reduce a change in a temperature of the image sensor.

2. The apparatus according to claim 1, wherein in the case in which the frame rate is lower than the predetermined frame rate, the controller causes the image sensor to perform a reset operation of the image sensor in accordance with the synchronization signal, and causes the image sensor to perform the temperature controlling operation after an elapse of a waiting time according to the predetermined frame rate from the reset operation.

3. The apparatus according to claim 2, wherein the controller determines the waiting time in accordance with the predetermined frame rate.

4. The apparatus according to claim 1, wherein the image sensor comprises a pixel array including a plurality of pixels,
each of the plurality of pixels includes a conversion element configured to convert radiation into an electric signal, and an in-pixel readout circuit configured to output a signal corresponding to the electric signal converted by the conversion element, and
the temperature controlling operation includes an operation of causing the in-pixel readout circuit to consume additional power other than power consumed by the in-pixel readout circuit in the image sensing operation.

5. The apparatus according to claim 4, wherein the in-pixel readout circuit includes an amplifier circuit including a current source and an amplifier transistor, which are connected in series, the amplifier transistor outputting a signal corresponding to the electric signal converted by the conversion element, and
the image sensing operation includes an operation of enabling the current source to detect the electric signal converted by the conversion element, and the temperature controlling operation includes an operation of enabling the current source to consume power to generate heat.

6. The apparatus according to claim 5, wherein the controller is configured to control an enable ratio that is a time during which the current source is enabled per unit time, and
the temperature controlling operation is executed to reduce a change in the enable ratio caused by a change in the frame rate.

7. The apparatus according to claim 1, wherein the temperature controlling operation is intermittently executed.

8. The apparatus according to claim 1, wherein the temperature controlling operation is continuously executed in part of a frame period defined by two continuous synchronization signals.

9. The apparatus according to claim 1, wherein the controller corrects the plurality of radiation images based on an offset image obtained by causing the image sensor to execute dummy image sensing in a state in which the radiation image sensing apparatus is not irradiated with radiation, and
the offset image is commonly used in correction of the plurality of radiation images.

10. A radiation image sensing system comprising:
a radiation source; and
a radiation image sensing apparatus arranged to detect radiation emitted by the radiation source,
wherein the radiation image sensing apparatus comprises an image sensor configured to sense a plurality of radiation images at a frame rate according to a synchronization signal, and a controller configured to control the image sensor, and
wherein in a case in which the frame rate is lower than a predetermined frame rate, the controller causes the image sensor to perform a temperature controlling operation of generating additional heat other than heat generated by an image sensing operation in addition to the image sensing operation so as to reduce a change in a temperature of the image sensor.

11. The system according to claim 10, wherein the radiation source and the radiation image sensing apparatus are attached to a rotatable C arm so as to face each other.

12. The system according to claim 11, wherein a frame rate is determined such that a subject is sensed at an equal angular interval during rotation of the C arm.

13. A radiation image sensing apparatus comprising an image sensor, and a controller configured to control the image sensor,
wherein the controller causes the image sensor to perform a temperature controlling operation of generating additional heat other than heat generated by an image sensing operation in addition to the image sensing operation so as to reduce a change in a temperature of the image sensor in a case in which the image sensor senses a plurality of radiation images.

14. The apparatus according to claim 13, wherein the image sensor is configured to sense a plurality of radiation images at a frame rate according to a synchronization signal, and
wherein in a case in which the frame rate is lower than the predetermined frame rate, the controller causes the image sensor to perform a reset operation of the image sensor in accordance with the synchronization signal, and causes the image sensor to perform the temperature controlling operation after an elapse of a waiting time according to the predetermined frame rate from the reset operation.

15. The apparatus according to claim 14, wherein the controller determines the waiting time in accordance with the predetermined frame rate.

16. The apparatus according to claim 13, wherein the image sensor comprises a pixel array including a plurality of pixels,
each of the plurality of pixels includes a conversion element configured to convert radiation into an electric signal, and an in-pixel readout circuit configured to output a signal corresponding to the electric signal converted by the conversion element, and
the temperature controlling operation includes an operation of causing the in-pixel readout circuit to consume additional power other than power consumed by the in-pixel readout circuit in the image sensing operation.

17. The apparatus according to claim 16, wherein the in-pixel readout circuit includes an amplifier circuit including a current source and an amplifier transistor, which are connected in series, the amplifier transistor outputting a signal corresponding to the electric signal converted by the conversion element, and
the image sensing operation includes an operation of enabling the current source to detect the electric signal converted by the conversion element, and the temperature controlling operation includes an operation of enabling the current source to consume power to generate heat.

18. The apparatus according to claim 17, wherein the controller is configured to control an enable ratio that is a time during which the current source is enabled per unit time, and
the temperature controlling operation is executed to reduce a change in the enable ratio caused by a change in the frame rate.

19. The apparatus according to claim 13, wherein the temperature controlling operation is intermittently executed.

20. The apparatus according to claim 13, wherein the image sensor is configured to sense a plurality of radiation images at a frame rate according to a synchronization signal, and wherein the temperature controlling operation is continuously executed in part of a frame period defined by two continuous synchronization signals.

21. The apparatus according to claim 13, wherein the controller corrects the plurality of radiation images based on an offset image obtained by causing the image sensor to execute dummy image sensing in a state in which the radiation image sensing apparatus is not irradiated with radiation, and the offset image is commonly used in correction of the plurality of radiation images.

22. The apparatus according to claim 13, wherein the image sensor is configured to sense a plurality of radiation images in response to a synchronization signal, and wherein the controller causes the image sensor to perform the temperature controlling operation after an elapse of a waiting time from a timing given by the synchronization signal.

23. A radiation image sensing system comprising:

a radiation source; and a radiation image sensing apparatus arranged to detect radiation emitted by the radiation source, wherein the radiation image sensing apparatus comprises an image sensor, and a controller configured to control the image sensor, and wherein the controller causes the image sensor to perform a temperature controlling operation of generating additional heat other than heat generated by an image sensing operation in addition to the image sensing operation so as to reduce a change in a temperature of the image sensor in a case in which the image sensor senses a plurality of radiation images.

* * * * *